United States Patent [19]

Ward et al.

[11] Patent Number: 5,054,382
[45] Date of Patent: Oct. 8, 1991

[54] 3 SLICE TOASTER

[76] Inventors: Edward D. Ward, 3810 Greenly St., Wheaton, Md. 20906; George Spector, 233 Broadway Rm 3815, New York, N.Y. 10007

[21] Appl. No.: 521,844

[22] Filed: May 4, 1990

[51] Int. Cl.⁵ .............................................. A47J 37/08
[52] U.S. Cl. ................................ 99/327; 99/329 RT; 99/332; 99/342; 99/389
[58] Field of Search ...................... 99/327, 328, 329 R, 99/329 P, 329 RT, 335, 332, 342, 389, 400; 219/492, 494, 495, 413, 501, 518

[56] References Cited

U.S. PATENT DOCUMENTS

| | | | |
|---|---|---|---|
| 1,682,683 | 8/1928 | Parodi | 99/327 |
| 1,717,979 | 6/1929 | Hummel et al. | 99/327 |
| 1,900,249 | 3/1933 | Miller et al. | 99/332 |
| 1,996,297 | 4/1935 | Langenfeld | 99/332 |
| 2,165,204 | 7/1939 | Anderson | 99/329 P |
| 2,329,937 | 9/1943 | Orkfritz | 99/327 |
| 2,387,817 | 10/1945 | Wales | 99/327 |
| 2,844,089 | 7/1958 | Lynch, Jr. | 99/329 R |
| 3,336,858 | 8/1967 | Maindonald | 99/391 |
| 4,140,048 | 2/1979 | Grove et al. | 219/489 |
| 4,346,651 | 8/1982 | Schickedanz | 219/492 |

FOREIGN PATENT DOCUMENTS 1293978  4/1969  Fed. Rep. of Germany ........ 99/332

Primary Examiner—Timothy F. Simone

[57] ABSTRACT

A toaster with one control system for toasting one slice of bread and another control system for toasting two different slices of bread in which the one slice control system and the two slice control system can be operated independently and together so that between one to three slices of bread can be toasted.

1 Claim, 1 Drawing Sheet

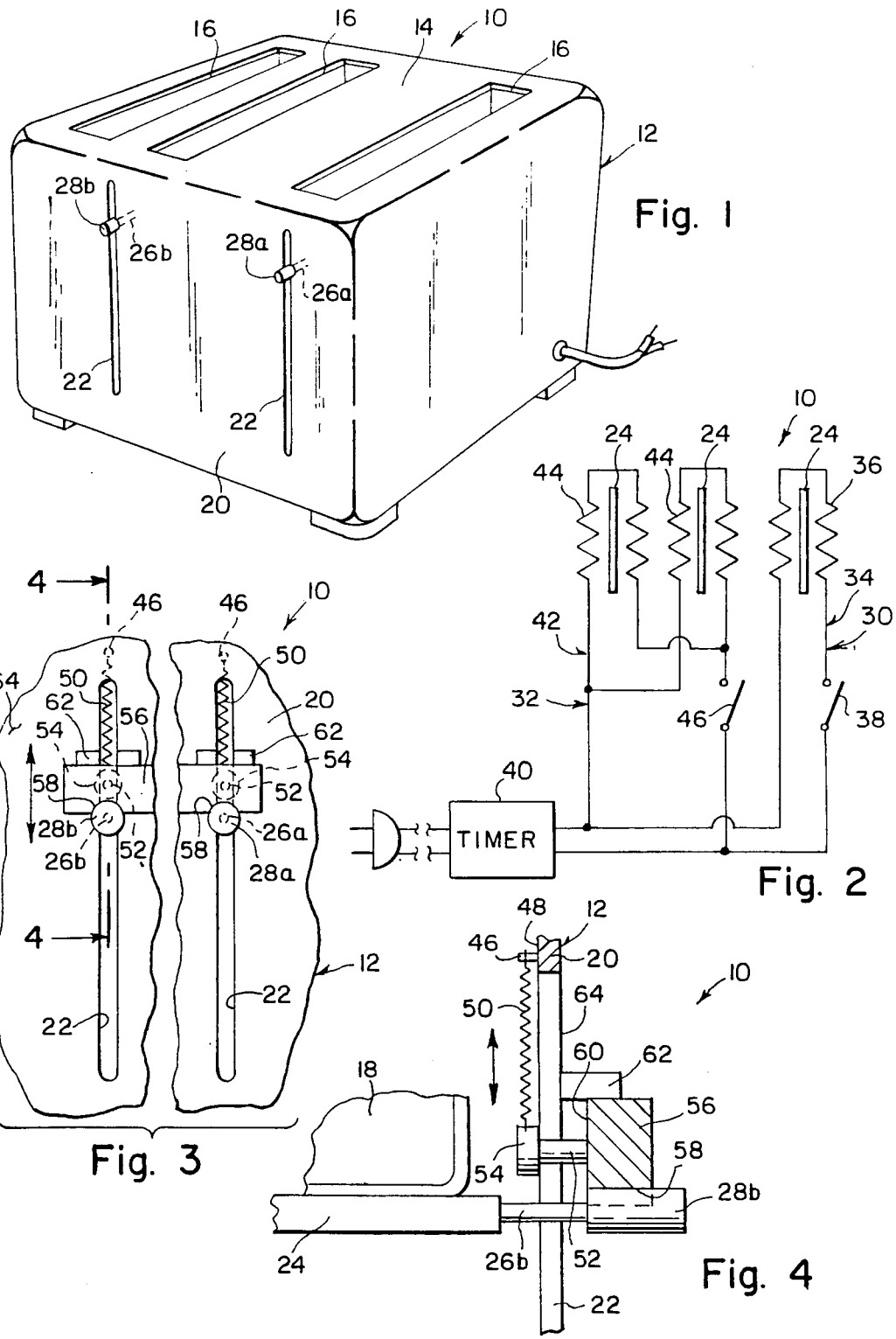

3 SLICE TOASTER

BACKGROUND OF THE INVENTION

The instant invention relates generally to electric toasters and more specifically it relates to a three slice toaster which provides a system for toasting between one to three slices of bread.

There are available various conventional electric toasters which do not provide the novel improvements of the invention herein disclosed.

SUMMARY OF THE INVENTION

A primary object of the present invention is to provide a three slice toaster that will overcome the shortcomings of the prior art devices.

Another object is to provide a three slice toaster that is structured for toasting between one to three slices of bread at a time.

An additional object is to provide a three slice toaster that includes a control system for toasting one slice of bread and another control system for toasting two different slices of bread in which the one slice control system and the two slice control system can be operated independently and together.

A further object is to provide a three slice toaster that is simple and easy to use.

A still further object is to provide a three slice toaster that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the three slice toaster.

FIG. 2 is a diagrammatic view of the electric circuit of the invention.

FIG. 3 is a front view of a modification with parts broken away, showing a spring upward biased cross bar permitting simultaneous operation of individual control knobs or independent operation.

FIG. 4 is a cross sectional view taken along line 4—4 in FIG. 3 showing the structure of the spring biased upward cross bar in greater detail.

DETAILED DESCRIPTION OF THE PREFERRED EMBODIMENTS

Turning now descriptively to the drawings, in which similar reference characters denote similar elements throughout the several views, the Figures illustrate a three slice toaster 10 consisting of a casing 12 with a top wall 14 having three longitudinally spaced openings 16, each adapted to receive downwardly therethrough a slice of bread 18 or the like and a front wall 20 having two vertical slots 22. Three carrier plates 24 are provided within the casing 12 below the openings 16 in which each support one slice of bread 18. A handle bar 26a is connected to one carrier plate 24 and extends through one of the vertical slots 22, while another handle bar 26b is connected to the other two carrier plates 24 and extends through the other vertical slot 22. A control knob 28a is connected to each free end of each of the handle bars 26.

A first system 30, within the casing 12, is for toasting one slice of bread 18, when the control knob 26a is pulled down manually. A second system 32, within the casing 12, is for toasting two slices of bread 18, when the control knob 26b is pulled down manually.

The first system 30 includes a first electric circuit 34, a pair of electric heating elements 36 in the first circuit 34, a normally opened first switch 38 in the first circuit 34 which will close when the handle bar 26a is pulled down and a timer 40 for controlling the flow of electricity from a power source to the pair of heating elements 36 in the first electric circuit 34 for toasting the one slice of bread 18.

The second system 32 includes a second electric circuit 42 in a parallel relationship with the first electric circuit 34, two pair of electric heating elements 44 in the second circuit 42, and a normally opened second switch 46 in the second circuit 42 which will close when the second handle bar 26b is pulled down. The timer 40 will also control the flow of electricity from the power source to the two pair of heating elements 44 in the second electric circuit 42 for toasting the two slices of bread 18.

The three slice toaster 10 as shown in FIGS. 3 and 4 is modified and further includes a pair of pins 46, each affixed to an inner surface 48 of the front wall 20 of the casing 12 above one of the vertical slots 22. A pair of return springs 50 are each affixed at its top end from one of the pins 46. A pair of rods 52 are provided in which each rod 52 has an enlarged head 54 and is positioned so that the rod 52 extends through and slides within one of the vertical slots 22. The head 54 is held therein, in which a bottom end of one spring 50 is affixed to the head 54. A cross bar 56 having two spaced apart concave bottom recesses 58 fit onto the top of the two control knobs 28a and 28b. The cross bar 56 is attached at its rear surface 60 to the rods 52, thus permitting a simultaneous operation of both of the control knobs 28a and 28b when the cross bar 56 is pulled downwardly, while allowing an independent operation of each of the control knobs 28a and 28b. Retainer stops 62 are affixed to an outer surface 64 of the front wall 20 of the casing 12 on both sides of the vertical slots 22 to hold the cross bar 56 and the two control knobs 28a and 28b in their normal non-operative position.

Conventional features, not shown in the drawings, can be provided for the three slice toaster 10 such as a removable and washable crumb tray, a darker-lighter control switch which can be indicated in braille for the sight impaired and an electronic chime, bell or audio device to indicate when the toast has popped up.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A three slice toaster comprising:
   (a) a casing with a top wall including three longitudinally spaced openings, each adapted to receive downwardly therethrough a slice of bread and a front wall having two vertical slots;

(b) three carrier plates within said casing below the openings, each supporting one slice of bread;

(c) two operating handle bars, said first handle bar is connected to one said carrier plate and extends through one of the vertical slots, while said second handle bar is connected to other two said carrier plates and extends through other of the vertical slots;

(d) two control knobs, said first control knob is connected to a free end of said first handle bar, while said second control knob is connected to a free end of said second handle bar;

(e) a first means within said casing for toasting one slice of bread, when said first control knob is pulled down manually; and (f) a second means within said casing for toasting the other two slices of bread independently from said first means, when said second control knob is pulled down manually; wherein said first means includes:

(g) a first electric circuit;

(h) a pair of electric heating elements in said first circuit;

(i) a normally opened first switch in said first circuit which will close when said first handle bar is pulled down; and (j) a timer for controlling the flow of electricity from a power source to said pair of heating elements in said first electric circuit, for toasting the one slice of bread; wherein said second means includes:

(k) a second electric circuit in a parallel relationship with said first electric circuit;

(l) two pair of electric heating elements in said second circuit; and (m) a normally opened second switch in said second circuit which will close when said second handle bar is pulled down so that said timer will control the flow of electricity from the power source to said two pair of heating elements in said second electric circuit for toasting the two slices of bread, in further combination with means mounted on said front wall for engaging and operating said knobs simultaneously; wherein the last said means comprises:

(n) a pair of pins, each affixed to an inner surface of the front wall of said casing above one of the vertical slots;

(o) a pair of return springs, each affixed at its top end from one said pin;

(p) a pair of rods, each having an enlarged head positioned so that said rod extends through and slides within one of the vertical slots with the head held therein, in which bottom end of one of said spring is affixed to the head;

(q) a cross bar having two spaced apart concave bottom recesses to fit onto the top of said two control knobs, said cross bar attached at its rear surface to said rods, thus permitting a simultaneous operation of both of said control knobs when said cross bar is pulled downwardly, while allowing an independent operation of each of said control knobs; and (r) retainer stops are affixed to an outer surface of the front wall of said casing on both sides of the vertical slots to hold said cross bar and said two control knobs in their normal non-operative position.

* * * * *